(12) United States Patent
Bernard et al.

(10) Patent No.: US 7,457,091 B2
(45) Date of Patent: Nov. 25, 2008

(54) PULLDOWN DRIVER WITH GATE PROTECTION FOR LEGACY INTERFACES

(75) Inventors: Dan P. Bernard, Austin, TX (US); John C. Schiff, Round Rock, TX (US); Glen A. Wiedemeier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 11/567,794

(22) Filed: Dec. 7, 2006

(65) Prior Publication Data

US 2008/0137250 A1    Jun. 12, 2008

(51) Int. Cl.
*H02H 3/20* (2006.01)
(52) U.S. Cl. .................................................. 361/91.1
(58) Field of Classification Search ................ 361/91.1, 361/88
See application file for complete search history.

(56) References Cited

U.S. PATENT DOCUMENTS 5,654,663 A * 8/1997 McClure et al. ............. 327/530

* cited by examiner

*Primary Examiner*—Stephen W Jackson
*Assistant Examiner*—Terrence R Willoughby
(74) *Attorney, Agent, or Firm*—Cantor Colburn LLP; Cas Salys

(57) ABSTRACT

A protection circuit with a positive field effect transistor coupled to a power source, a negative field effect transistor connected to a pass-gate and a circuit ground, a circuit input terminal, a multi-level source of protection voltage coupled to an external circuit and at least three additional field effect transistors. A drain of the negative field effect transistor couples to a gate of the positive field effect transistor. When the circuit input terminal is low the pass-gate is on; when the circuit input terminal is high the pass-gate is off. Embodiments of the invention also include stacks of three or more field effect transistors.

1 Claim, 2 Drawing Sheets

PULLDOWN DRIVER WITH GATE PROTECTION FOR LEGACY INTERFACES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to circuitry that utilizes field effect transistors (FET) and more particularly to circuitry that provides protection from voltage levels above an acceptable CMOS operating voltage range and from other forms of device degradation.

2. Description of the Background

Continuing development of semi-conductor devices for use in input/output (I/O) circuitry has resulted in semi-conductor devices that have smaller oxide thickness. The smaller oxide thicknesses, has in turn translated into a reduction in voltage ratings of the semi-conductor devices. At times, such semi-conductor devices must be able to communicate with a higher voltage rail legacy interface. Legacy interfaces have voltage rails typically greater than 2.5V. $V_{max}$ is the highest voltage rating of a semi-conductor device that if exceeded, will result in the destruction of the device during operation. FIG. 1 shows a prior art example of an FET semi-conductor device in which a voltage rail in excess of the device's $V_{max}$ would cause its destruction. Currently known solutions to this problem rely on large resistor networks to reduce circuit voltage levels. However, such an arrangement draws large amounts of power.

What is needed is a more effective technique for protecting semi-conductor devices employed in connection with the higher voltage rails of certain legacy circuits.

SUMMARY OF THE INVENTION

The shortcomings of the prior art are overcome and additional advantages are provided through the provision of a pull-down open-drain driver for a legacy interface. This arrangement utilizes a low power, low area solution that protects the oxide of an FET driver.

Embodiments of the invention include a protection circuit with a positive field effect transistor coupled to a power source, a negative field effect transistor coupled to a pass-gate and a circuit ground, a circuit input terminal and a multi-level source of protection voltage coupled to an external circuit. A drain of the negative field effect transistor couples to a gate of the positive field effect transistor. When the circuit input terminal is low the pass-gate is on; when the circuit input terminal is high the pass-gate is off.

Embodiments of the invention also include at least one stack of three or more field effect transistors. At least one of the three field effect transistors in each stack is continually on. According to certain embodiments of the invention, the pass-gate turns on one or more bottom drive field effect transistor of the stack, in response to a data input.

Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Various embodiments of the invention as described herein are configured in such a way as to protect an FET (e.g. FET, MOSFET, etc.) driver from experiencing a maximum voltage potential ($V_{max}$) condition. This is accomplished by use of a circuit that alternately biases driver gates to either of the following levels: 1) in the case of a zero logic level, a local on-chip voltage; or 2) in the case of a logic level one, a voltage derived from dividing the legacy pull-up voltage rail to a value that protects the driver gates. The generated voltage is derived from the pull-up voltage directly, so no additional pin and bias circuit is necessary to generate the bias voltage. As with all integrated circuits the minimization of power consumption and conservation of real estate is a top priority. The described arrangement generates a protection voltage at the same time as avoiding such high power, high real-estate solutions as resistor networks.

Figure 1:
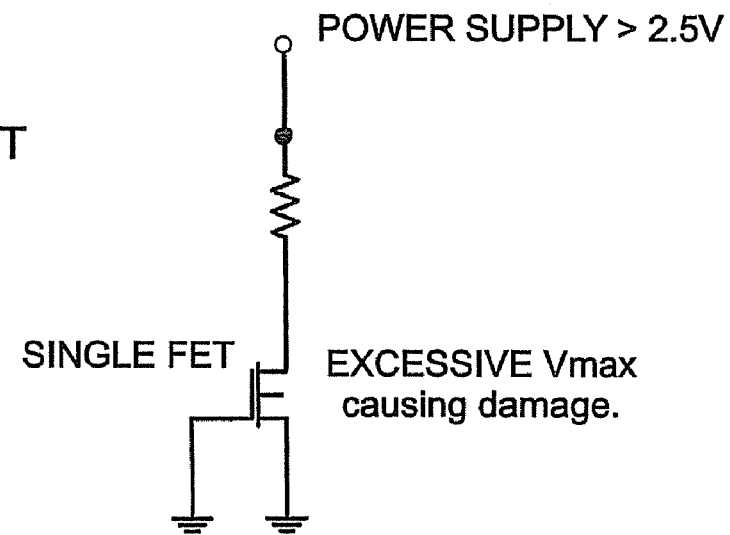
FIG. 1 depicts a prior art circuit with a MOSFET subject to device degradation as a result of an application of a voltage level in excess of $V_{max}$.
Figure 2:
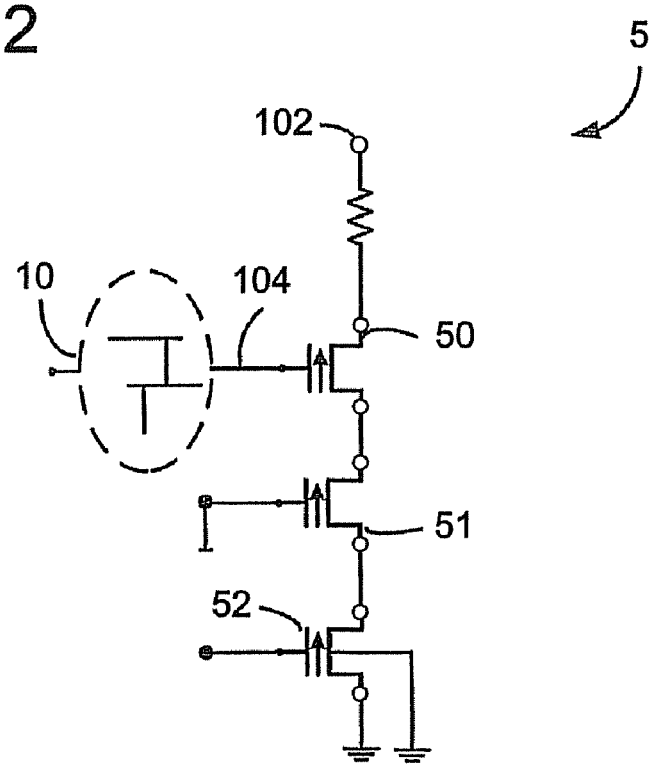
FIG. 2 depicts an alternative MOSFET circuit design illustrating a configuration of stacked FET's and the application of a protection voltage according to one embodiment of the invention.
Figure 3:
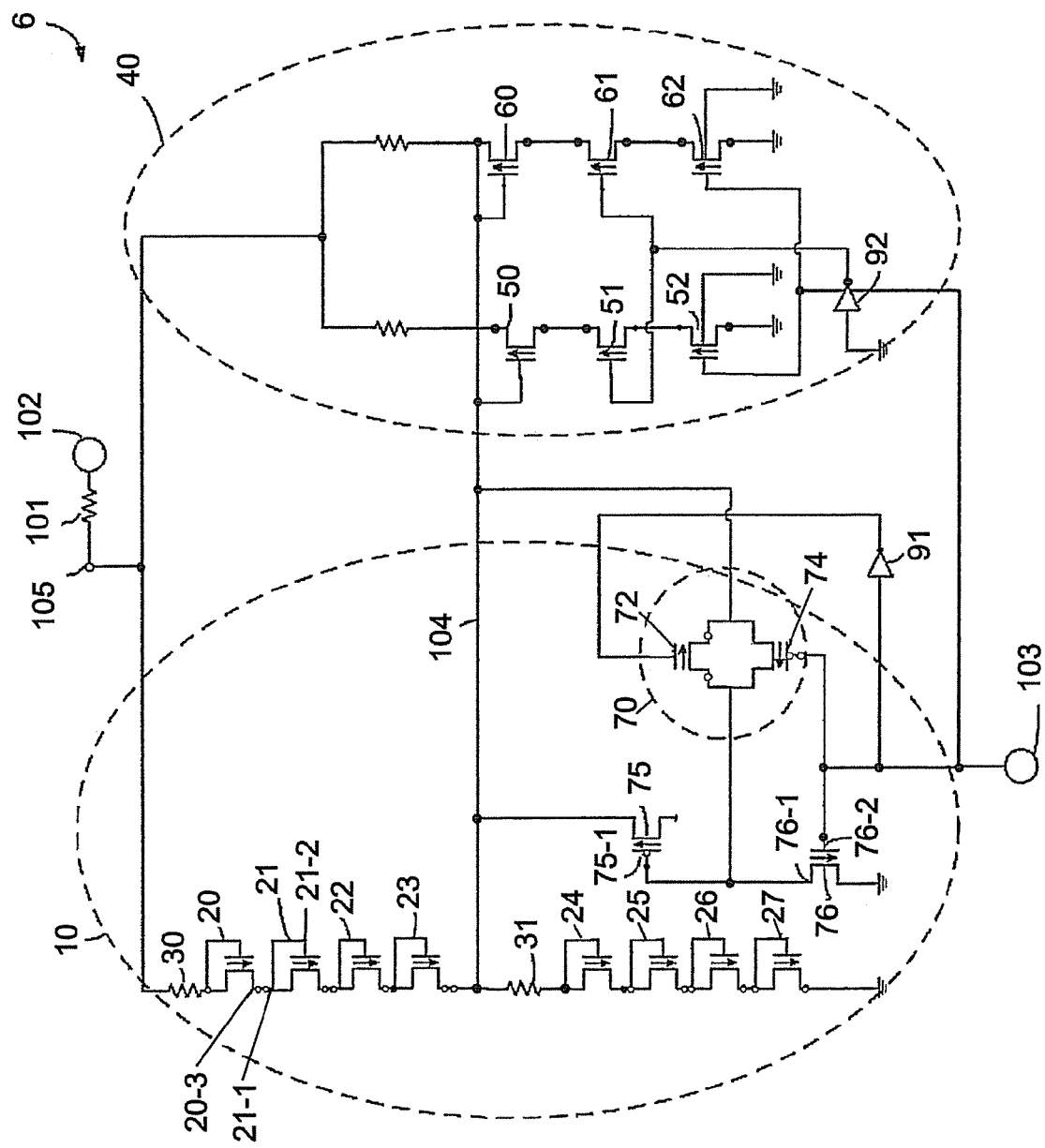
FIG. 3 is a detailed circuit diagram including portions of circuits for voltage control and for multi-state data input according to one embodiment of the invention; and The detailed description explains exemplary and preferred embodiments of the invention together with advantages and features, with reference to the drawings.

Now referring to the figures, embodiments of the invention as depicted in FIG. 2 demonstrate a simplified depiction of a Field Effect Transistor (FET) protection circuit 5. The protection circuit 5 includes a power source 102 (e.g. legacy voltage rail, power supply, constant voltage source, etc.), a voltage control circuit 10 and a stack of 3 FET's (e.g. MOSFET, IGFET, etc.). The stack of 3 FET's include a top FET 50 to which a voltage control line 104 asserts a controlled voltage, a middle FET 51 and a drive FET 52. The voltage control circuit 10 may couple to an external circuit according to one alternative embodiment of the invention. FIG. 3 provides a more detailed version and discussion of such a voltage control circuit 10.

$V_{max}$ is a design characteristic of an FET measured in the form of a maximum voltage potential. For example, typical FET's have a $V_{max}$ of two (2) volts. Degradation of the FET occurs as a result of subjecting the FET (e.g. a drive FET 52) to a voltage potential in excess of $V_{max}$. A $V_{max}$ condition may occur as a result of excess voltage potential between the gate and drain or between the gate and source of an FET. Within the protection circuit 5, the combined contribution of both the voltage control circuit 10 and the operation of the top and middle FET's 50, 51 protects the drive FET 52 from degradation.

Although FIG. 2 shows only one stage of stacked FET's (i.e. the top FET 50, middle FET 51 and drive FET 52), multiple stages of stacked FET's may be coupled in parallel according to one alternative embodiment of the invention.

FIG. 3 provides a more elaborate circuit diagram of a protection circuit 6 that includes the voltage control circuit 10, a three stack FET driver section 40, a power source 102 and an off-chip pull-up resistor 101 tied to a pad 105. The protection circuit 6 also includes a circuit input terminal 103 for connecting to a data source of an external circuit. In this exemplary protection circuit 6, the voltage potential of a legacy circuit tied to the pad 105 is greater than the $V_{max}$ of the driver FET's 52, 62, etc.

The voltage control circuit 10 comprises one or more coupled FET's 20-27 (e.g. MOSFET, etc.) in which the drains of a multiple of the FET's 20-27 each couple to the gate of a next one of the multiple FETs 20-27. For example, the drain electrode 20-3 of a first FET 20 connects to a gate electrode 21-2 and source electrode 21-1 of a second FET 21. This FET connection scheme is referred to as a diode connection.

The diode-connected FET's 20-27 and resistors 30-31 form a high resistance path that limits current flow from an external pull-up. Because the voltage control circuit 10 has a similar number of FET's (e.g. 4 FET's 20, 21, 22 and 23) coupled to the pull-up resistor 101 and pad 105 as the number of FET's (e.g. 4 FET's 24, 25, 26 and 27) that couple to ground, the voltage potential of the gate protection voltage control line 104 is reduce by a ratio of the numbers of FET's in each of the two sets of FET's to the total number of FET's. For example, with two sets of four FET's each as depicted, if the pad 105 voltage potential was 3.0 volts, the voltage potential of the gate protection voltage control line 104 would be 1.5 volts.

Embodiments of the invention also include a pass-gate circuit 70, a positive FET 75 (i.e. coupled to a voltage control line 104), a negative FET 76 (i.e. coupled to the pass-gate circuit 70), a circuit ground and a circuit input terminal 103. A drain 76-1 of the negative FET 76 couples to a gate 75-1 of the positive FET 75. When the circuit input terminal 103 is low, the pass-gate 70 is on; when the circuit input terminal 103 is high the pass-gate 70 is off.

With respect to the stacked FET driver section 40, individual stacks of FET's each include three or more FET's (e.g. 50, 51, 52, etc.). The protection circuit 6 may contain one or more individual stacks of FET's (e.g. 50-52, 60-62, etc.). At least one of the three or more FET's (e.g. 50, 51, 52, etc.) in each stack is on continually.

The protection circuit 10 provides additional voltage control when data provided to the circuit input terminal 103 is low. The "low" input turns the pass-gate 70 formed by two FET's 72, 74 on. When the pass-gate 70 is turned on, the voltage asserted by the voltage control line 104 is tied to the gate 76-2 of the negative FET 76.

As the voltage of pad 105 rises toward the voltage asserted by the power source 102, the voltage of voltage control line 104 rises to a value less than the $V_{max}$ of the top FET's 50, 60 of the drive section 40. With the voltage control line 104 protection voltage safely less than $V_{max}$, the top FET's 50, 60 are protected (i.e. no $V_{max}$ condition occurs).

When data is provided, the circuit input terminal 103 is high. Accordingly the pass-gate 70 is turned off. Next, the negative FET 76 turns on causing the positive FET 75 to turn on. Finally, with the positive FET 75 on, the voltage control line 104 couples to the power source, which turns on the top FET's 50, 60. With the negative FET 76 and the positive FET 75 (that is coupled to the top FET's 50, 60 and the voltage control line 104) turned on, a low resistance path is formed thereby pulling the pad 105 (e.g. terminal or line) close to ground. Accordingly, there is no danger of a $V_{max}$ condition occurring on any of the drive FET's 52, 62.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A protection circuit for protecting a drive field effect transistor, the protection circuit comprising:
   a voltage control circuit comprising:
   a positive field effect transistor coupled to a power source;
   a negative field effect transistor coupled to a pass-gate and a circuit input terminal wherein a drain of the negative field effect transistor couples to a gate of the positive field effect transistor;
   wherein when the circuit input terminal is low, the pass-gate is on and when the circuit input terminal is high, the pass-gate is off; and
   a plurality of diode connected field effect transistors and a plurality of resistors in series with the plurality of diode connected field effect transistors, the pluralities forming a high resistance path to limit current from the power source;
   wherein the voltage control circuit is coupled to a stacked field effect transistor section by a voltage control line connecting the plurality of diode connected field effect transistors and plurality of resistors;
   the stacked field effect transistor driver section comprising:
   at least three field effect transistors wherein at least one of the at least three field effect transistors is continually on and wherein the pass-gate is configured to turn on at least one top field effect transistor to pull a terminal voltage close to ground to protect at least one bottom drive field effect transistor.

* * * * *